Patented May 7, 1935

2,000,313

UNITED STATES PATENT OFFICE 2,000,313

WATER-INSOLUBLE AZO-DYESTUFFS AND FIBER DYED THEREWITH

Arthur Zitscher, Offenbach-on-the-Main, and Wilhelm Lamberz, Leverkusen-Wiesdorf, Germany, assignors to General Aniline Works, Inc., New York, N. Y., a corporation of Delaware No Drawing. Application January 9, 1934, Serial No. 705,970. In France January 12, 1933

14 Claims. (Cl. 260—95)

The present invention relates to water-insoluble azo-dyestuffs and to fiber dyed therewith.

We have found that valuable water-insoluble azo-deystuffs are obtainable by combining arylides of 2,3-hydroxy-naphthoic acid of the following formula:

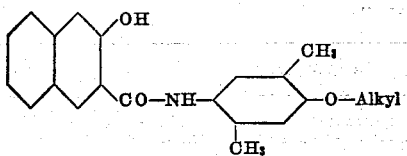

with diazo, tetrazo or diazoazo compounds which do not contain sulfonic acid or carboxylic acid groups.

The new dyestuffs correspond to the following general formula:

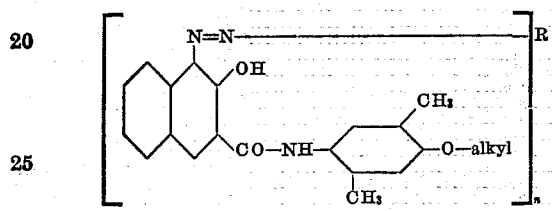

wherein R stands for a radial of the benzene, naphthalene, diphenyl, carbazole or anthraquinone series and $n$ means, the number 1 or 2. They have the most varied shades and are distinguished by their very good fastness properties. They may be used for the preparation of pigment dyestuffs; they may also be produced on the vegetable or animal fiber, by printing or according to the ice color method.

The 2,3-hydroxynaphthoyl-(1-amino-2,5-dimethylbenzene-4-alkylethers) used as coupling components may be prepared by condensing 2,3-hydroxynaphthoic acid with 1-amino-2,5-dimethylbenzene - 4 - alkyl - ethers according to known methods, for instance, in toluene with addition of phosporus trichloride. 2,3-hydroxynaphthoyl -(1-amino-4-methoxy - 2,5 - dimethylbenzene) crystallizes from chlorobenzene in the form of fine clustered needles melting at 223° C. to 224° C. 2,3-hydroxynaphthoyl-(1-amino-4-ethoxy-2,5-dimethylbenzene) crystallizes from alcohol in the form of fine needles melting at 190° C. to 191° C.

The 1-amino-2,5-dimethylbenzene-alkylethers are obtainable by nitrating 2-chloro-1,4-dimethylbenzene, exchanging the chlorine atom of the resultant nitro-compound for a alkoxy-group and reducing the compound thus obtained. 1-amino-4-methoxy-2,5-dimethylbenzene melts after recrystallization from ligroin at 72° C., 1-amino-4-ethoxy-2,5-dimethylbenzene melts when recrystallized from benzine at 69° C. to 70° C.

The following examples illustrate the invention.

1. 14.2 grams of 1-amino-2-methyl-5-chlorobenzene are diazotized in known manner and the diazo solution is coupled with a solution of 35 grams of 2,3 - hydroxynaphthoyl - (1 - amino - 4 - methoxy-2,5-dimethylbenzene) in dilute caustic soda solution which has been mixed with Turkey red oil and a quantity of sodium acetate which is sufficient for binding the excess of mineral acid. The dyestuff which precipitates has the following formula:

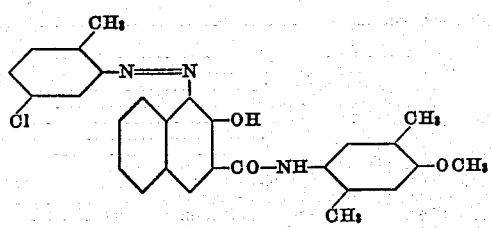

It is filtered and well washed. In order to prepare pigment dyestuffs therefrom it is advantageously used in the form of a paste and furnishes, when mixed with a suitable substratum, a red lake of very good fastness properties.

2. Well boiled and dried cotton yarn is impregnated with a solution of 6 grams of 2,3-hydroxynaphthoyl - (1 - amino - 4 - methoxy - 2,5 - dimethylbenzene), 12 cc. of caustic soda solution of 34° Bé. and 12 cc. of Turkey red oil per liter. The material is thoroughly squeezed and developed in a diazo solution, neutralized with sodium acetate, containing 1.68 grams of 1-amino-2-methoxy-4-nitrobenzene per liter, then rinsed and soaped at boiling temperature.

A currant shade of very good fastness properties is obtained. The dyestuff has the following formula:

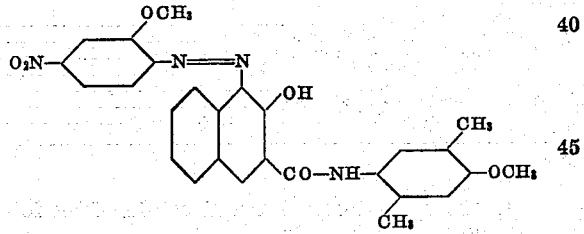

3. Suitably pre-treated cotton yarn is impregnated with a solution of 5 grams of 2,3-hydroxynaphthoyl - (1 - amino - 4-methoxy-2,5-dimethylbenzene), 10 cc. of caustic soda solution of 34° Bé. and 10 cc. of Turkey red oil per liter. The material is thoroughly squeezed and developed in a diazo solution, neutralized with sodium acetate, containing per liter 2.9 grams of 1-amino-2-methoxybenzene - 5 - sulfonyldiethylamine, then well rinsed and soaped at boiling temperature. A clear bluish-red dyeing is obtained of very good fastness properties. The dyestuff has the following formula:

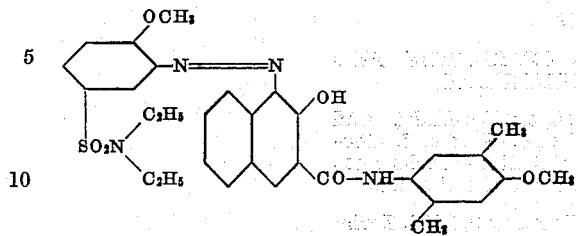

The dyestuffs may also be produced on other fibers, such as silk or wool, or by one of the known printing processes.

In the same manner the process may be carried out with other diazo, tetrazo or diazoazo compounds and other 2.3-hydroxynaphthoic acid arylides of the above named general formula. The following table describes a further number of azo-dyestuffs according to this invention.

naphthalene, diphenyl, carbazole or anthraquinone series and $n$ means the number 1 or 2, yielding, when produced on the fiber, dyeings of various shades and very good fastness properties.

2. The water-insoluble azo-dyestuffs of the following general formula:

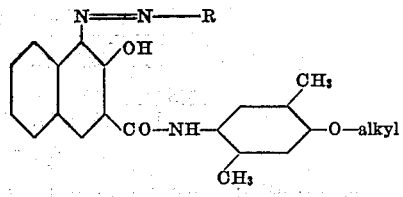

wherein R stands for a radical of the benzene, naphthalene, diphenyl, carbazole or anthraquinone series, yielding, when produced on the fiber, dyeings of various shades and very good fastness properties.

| Diazo compound from | Coupling component | Shade |
|---|---|---|
| 1-amino-3-chlorobenzene | 2,3 - hydroxynaphthoyl - (1 - amino - 4-methoxy-2,5-dimethylbenzene). | Red. |
| 1-amino-2-methyl-4-chlorobenzene | do | Do. |
| 1-amino-2-methyl-3-chlorobenzene | do | Do. |
| 1-amino-2-methyl-5-nitrobenzene | do | Do. |
| 1-amino-2-methoxy-5-nitrobenzene | do | Scarlet red. |
| 1-amino-4-methyl-2-nitrobenzene | do | Bordeaux red. |
| 1-amino-4-chloro-2-nitrobenzene | do | Deep red. |
| 1-amino-4-methoxy-2-nitrobenzene | do | Garnet. |
| 1-amino-4-benzoylamino-2-methoxy-5-methylbenzene | do | Red violet. |
| 1-amino-4-benzoylamino-2,5-dimethoxybenzene | do | Reddish blue. |
| 1-amino-4-benzoylamino-2,5-diethoxybenzene | do | Do. |
| 1-amino-4-benzoylamino-5-methoxy-2-methylbenzene | do | Violet. |
| 1-amino-4-benzoylamino-5-methoxy-2-chlorobenzene | do | Do. |
| 1-amino-4-acetylamino-5-methoxy-2-phenoxybenzene | do | Bluish Bordeaux red. |
| 1,4-diamino-2,3-dimethyl-6-bromobenzene | do | Do. |
| 4-amino-3,2'-dimethyl-azobenzene | do | Grenade. |
| 4-amino-2,5-dimethoxy-4'-nitroazobenzene | do | Reddish black. |
| 1-amino-4-(2'-ethoxy-phenyl-1'-azo)-naphthalene | do | Black. |
| 4,4'-diamino-3,3'-dimethoxydiphenyl | do | Blue. |
| 1-amino-4-benzoylamino-2,5-dichlorobenzene | do | Bordeaux red. |
| 1-amino-2-methyl-benzene-5-sulfonyl-diethylamine | do | Clear yellowish red. |
| 1-amino-2-methoxy-benzene-5-sulfonylbenzylmethylamine | do | Bluish red. |
| 1-amino-2-ethoxy-benzene-5-sulfonyl-diethylamine | do | Clear bluish red. |
| 1-amino-3-benzoyl-benzene | do | Yellow red. |
| 1-amino-2,4,5-trichloro-benzene | do | Brown red. |
| 3-amino-4,4'-dichloro-diphenyl | do | Red. |
| 1-amino-2-phenoxy-5-chlorobenzene | do | Do. |
| 1-amino-2-(2',5'-dichloro-phenoxy)-5-chlorobenzene | do | Yellowish red. |
| 1-amino-2-phenylsulfonylbenzene | do | Red orange. |
| 1-amino-2-chloro-5-trifluormethylbenzene | do | Brown red. |
| 2-amino-1,6-dibromo-naphthalene | do | Blue red. |
| 3-amino-carbazole | do | Dark violet. |
| 2,7-diamino-carbazole | do | Black blue. |
| 4,4'-diamino-3,3'-dichlorodiphenyl | do | Currant. |
| 1-amino-2-nitrobenzene | do | Bordeaux red. |
| 1-amino-2,5-dichloro-benzene | do | Orange brown. |
| 1-amino-anthraquinone | do | Brown red. |
| 2,6-diamino-anthraquinone | do | Bluish red. |
| 1-amino-2-methyl-4-nitrobenzene | do | Bluish Bordeaux. |
| 1-amino-2-methoxy-4-nitrobenzene | do | Currant. |
| 1-amino-2-chloro-benzene | 2.3-hydroxynaphthoyl-(1-amino-4-ethoxy-2.5-dimethylbenzene). | Red brown. |
| 1-amino-2,4,5-trichloro-benzene | do | Brownish red. |
| 1-amino-3-methyl-4,6-dichlorobenzene | do | Yellowish red. |
| 1-amino-2-phenoxy-5-chlorobenzene | do | Bluish red. |
| 1-amino-2-methyl-4-bromo-5-chlorobenzene | do | Do. |
| 1-amino-2-nitroaniline | do | Deep red. |
| 1-amino-2-methyl-5-nitro-benzene | do | Yellowish red. |
| 4-amino-3-methoxy-6,4'-dimethyl-2'-nitroazobenzene | do | Dark currant. |

We claim:
1. The water-insoluble azo-dyestuffs of the following general formula:

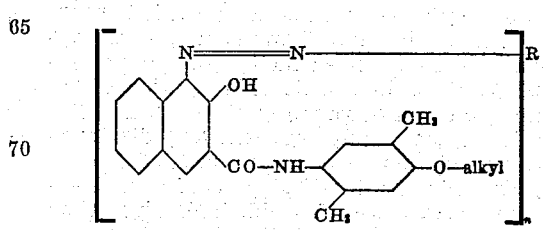

wherein R stands for a radical of the benzene,

3. The water-insoluble azo-dyestuffs of the following general formula:

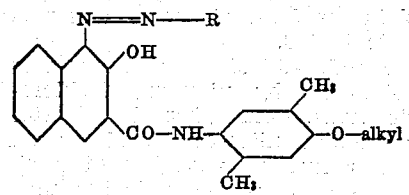

wherein R stands for a radical of the benzene series, yielding, when produced on the fiber, dyeings of various shades and very good fastness properties.

4. The water-insoluble azo-dyestuffs of the following general formula:

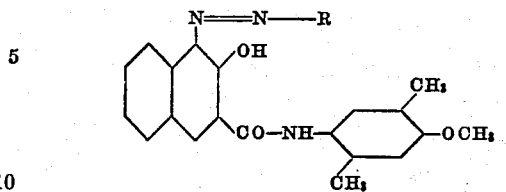

wherein R stands for a radical of the benzene series, yielding, when produced on the fiber, dyeings of various shades and very good fastness properties.

5. The water-insoluble azo-dyestuff of the following formula:

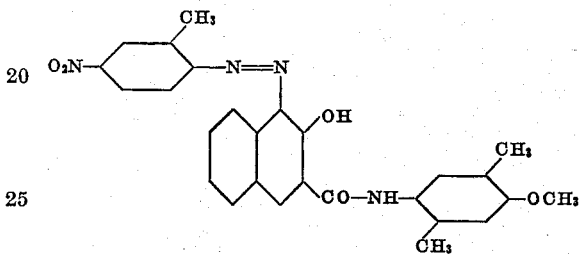

yielding, when produced on the fiber, a bluish Bordeaux red dyeing of good fastness properties.

6. The water-insoluble azo-dyestuff of the following formula:

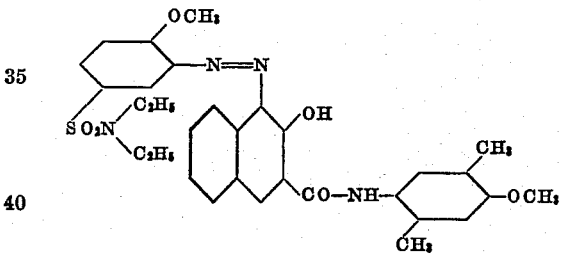

yielding, when produced on the fiber, a bluish red dyeing of good fastness properties.

7. The water-insoluble azo-dyestuff of the following formula:

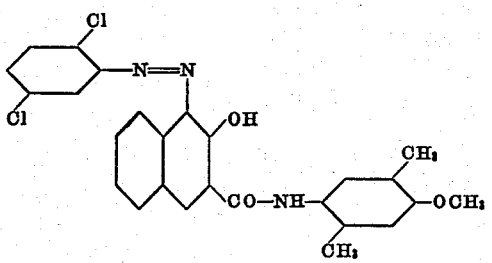

yielding, when produced on the fiber, an orange brown dyeing of good fastness properties.

8. Fiber dyed with the azo-dyestuffs as claimed in claim 1.
9. Fiber dyed with the azo-dyestuffs as claimed in claim 2.
10. Fiber dyed with the azo-dyestuffs as claimed in claim 3.
11. Fiber dyed with the azo-dyestuffs as claimed in claim 4.
12. Fiber dyed with the azo-dyestuff as claimed in claim 5.
13. Fiber dyed with the azo-dyestuff as claimed in claim 6.
14. Fiber dyed with the azo-dyestuff as claimed in claim 7.

ARTHUR ZITSCHER.
WILHELM LAMBERZ.